Figure 3:
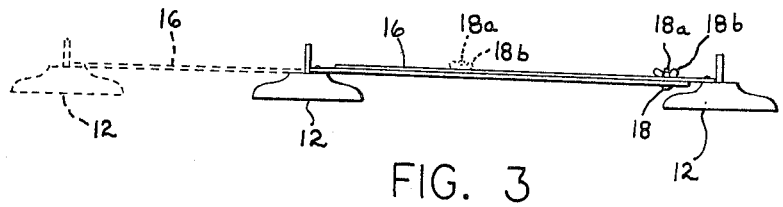

Oct. 11, 1966 L. A. PEDEE 3,278,150
SUPPORTING STAND
Filed March 17, 1965 2 Sheets-Sheet 1
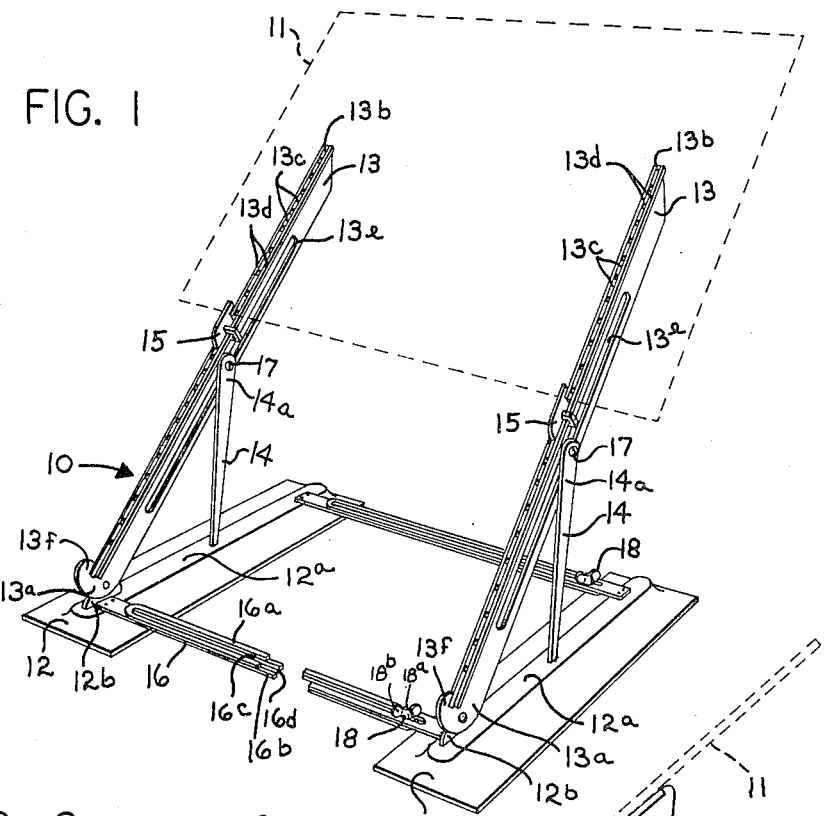
FIG. 1
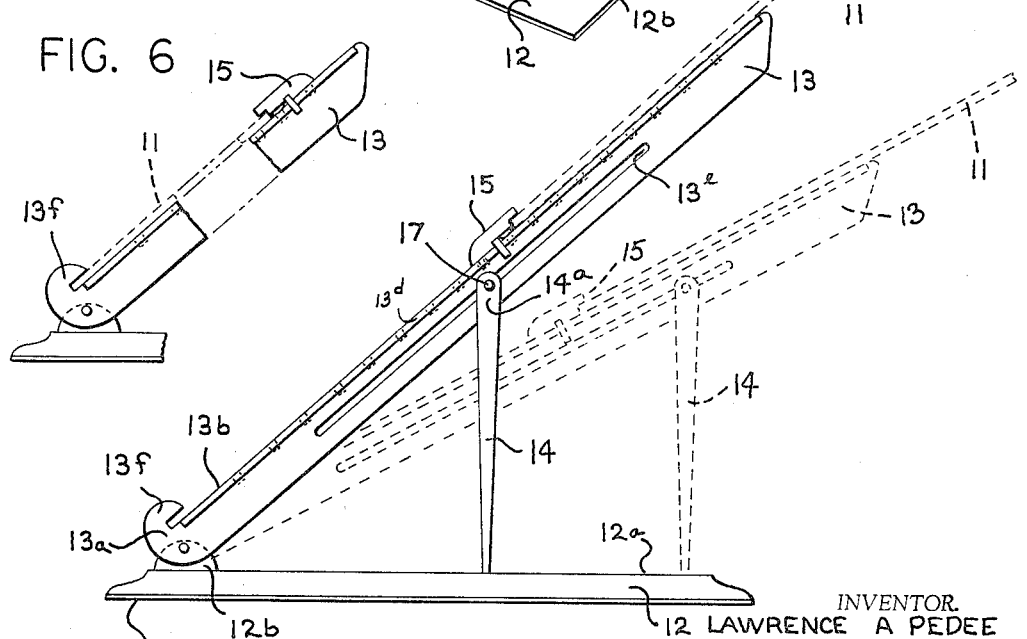
FIG. 6
FIG. 2
INVENTOR.
LAWRENCE A PEDEE
BY Denee & Stutz
ATTORNEYS Oct. 11, 1966  L. A. PEDEE  3,278,150
SUPPORTING STAND Filed March 17, 1965  2 Sheets-Sheet 2

INVENTOR.
LAWRENCE A. PEDEE
BY Dence & Stutz
ATTORNEYS 3,278,150
SUPPORTING STAND
Lawrence A. Pedee, 608 Continental Blvd., Toledo, Ohio
Filed Mar. 17, 1965, Ser. No. 440,359
13 Claims. (Cl. 248—456)

The present invention pertains in its general relationship to a display or supporting stand of the characteristic type employed for supporting an artist's canvas, display placards, or other relatively stiff paper or cardboard panels such as might be utilized as drawing or painting surfaces or for various exhibition or model purposes.

In more specific respects, the supporting stand typified by the present invention is of that structural type and character which frequently is alluded to as an "easel"-type of supporting stand and is particularly adapted to support an artist's canvas, drawings, display placards, and the like, in an upwardly facing inclined position which will afford a convenient, readily accessible and easily viewable work surface.

Conventional supporting stands of the type commonly referred to as an "easel" ordinarily are quite large and bulky and are of such construction that they are not readily susceptible to being transported from place-to-place by the user and they are not constructed in such manner that they may be readily erected and dismantled by the user. Also, the conventional-type of easel ordinarily is not of such a design or construction suitable for use in small or restricted work areas, such as the living quarters of a home, nor is it suitable for use in relatively restricted display areas, such as a show case or the like.

Accordingly, one of the salient objectives of the present invention is the provision of a supporting stand having a construction which is particularly well-suited for use in confined locations, such as a show case or the like, or for use on a table-top, or card-table, or the like, for supporting a painting, drawing, or exhibit, or the like.

Another objective of the present invention is the provision of a working stand which is capable of being readily erected, dismantled and reassembled such that the supporting stand may be conveniently set up or taken down and may be easily moved or transported in a collapsed condition.

Another objective of the present invention is the provision of a supporting stand having structural characteristics which render the supporting stand readily adjustable to accommodate work or display materials having widely varying dimensional characteristics.

A further objective of the present invention is the provision of a work supporting stand which is of a size suitable for use upon a table-top, or the like, and which when so used possesses a substantial degree of stability and adjustability.

Another objective of the present invention is to provide a work supporting stand characterized by having an easel-type structure which may be readily and conveniently dismantled and reassembled.

A still further objective of the present invention is the provision of an "easel" which presents a neat and attractive appearance, and which is both simple and practical in construction and susceptible to being fabricated from relatively inexpensive, lightweight materials.

Figure 4:
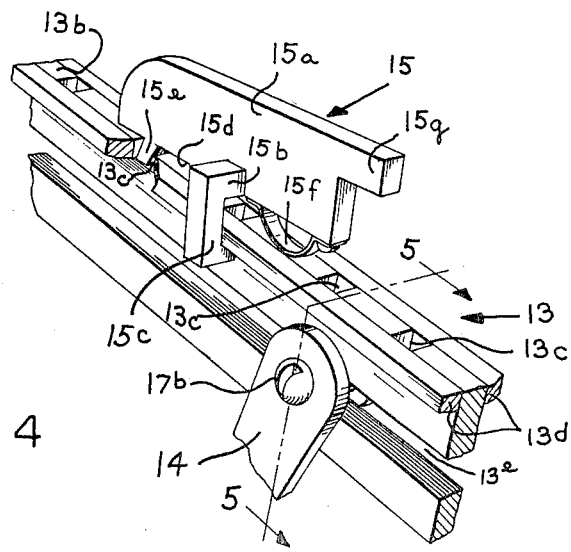
Figure 5:
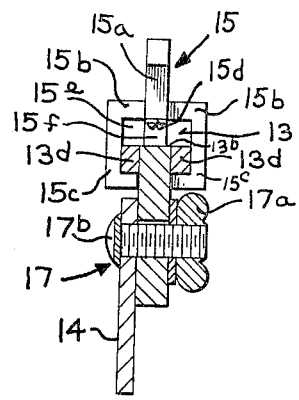

Other objects and advantages will, of course, become apparent to those skilled in the art from the following detailed description taken in conjunction with the annexed drawings wherein one preferred embodiment of the present invention is illustrated, and wherein:

FIG. 1 represents a perspective view, in elevational aspect, of an adjustable supporting stand or easel embodying the present invention, and depicting the same in one of its various operative upright positions supporting a placard, artist's "canvas," sheet of drawing material, or the like; and, FIG. 2 is a side elevational view of the embodiment depicted in FIG. 1, and for comparative purposes further showing, in broken lines, another alternative upright position thereof; and, FIG. 3 is a front elevational view illustrating only the base structure of the embodiment shown in FIG. 1, and, by the use of solid and broken lines, depicting such base structure in two of its various alternative extended and retracted positions; and, FIG. 4 is an enlarged, fragmentary, perspective view more clearly showing the structural characteristics of one of the adjustable work holders and its cooperative interrelationship with one of the supporting stand leg members; and, FIG. 5 is a sectional view taken along and in the direction of the sectional plane 5—5 indicated in FIG. 4; and, FIG. 6 is a fragmentary view generally similar to FIG. 2, but depicting the work holder in its functional aspect in a reversed position on the leg member holding the upper edge of a work piece.

In accordance with a preferred mode of the present invention, the supporting stand 10, which may be best observed in FIG. 1, is of a relatively simplified construction and non-burdensome size designed to be suitable for use in an erected position upon a card-table, dining room table, or the like, or within a confined location such as a small show case. Additionally, the relatively small size and simplified design facilitates the setting up and taking down of the stand, as well as the transportability thereof.

Briefly, and in keeping with its intended use, the work supporting stand 10 is depicted as an adjustable artist's easel, or display stand, on which an artist's canvas or work piece, such as is shown in broken lines and indicated by the reference number 11, may be supported. The stand 10 has a sectional base member comprised of generally identical rectangular platform sections 12. Also, the stand 10 includes generally identical and elongated work supporting sections, or legs 13, which are each adapted to pivot about one longitudinal end, or pivot end 13a, between a lowered position and various alternative inclined raised positions. Means for selective adjustment of the angle of inclination of each of the respective supporting legs 13 relative to the platform sections 12 is provided by a pair of elongated positioning props 14, each of which has one end portion adjustably interconnected, for shiftable movement along the medial section of one of the supporting legs 13 and an opposite end portion adapted to seat on the upper side of one of the platform sections 12. Riding on the frontal side of each of the supporting legs 13 and serving to gravitationally support the work piece 11, which might be a placard, canvas painting or other similar material, there is a work holder 15. As illustrated, the platform sections 12 are arranged in side-by-side relationship and retained in such relationship by telescopically adjustable cross members 16 which afford selective adjustment of the spacing between the platform sections 12 and the supporting legs 13 carried on the platform sections.

In more detailed respects, the platform sections 12 are preferably fabricated, or molded, from a lightweight plastic material, but may, of course, also be formed from wood, metal, or the like. Rising from the upper side of each of the platform sections 12 and running substantially the full length thereof, there is a medial pedestal 12a and at the forward end of each of the platform sections there is an upstanding mounting flange 12b providing a pivotal mounting for the pivot end 13a of one each of the supporting legs 13.

The work supporting legs 13, like the platform sections 12, are preferably fabricated or molded from a lightweight plastic material, but alternatively may be constructed from wood, metal, or the like. As best viewed in FIGS. 4 and 5, each of the legs 13 defines a generally T-shaped cross-sectional configuration. In this latter respect, each of the legs 13 includes a narrow forwardly disposed frontal side 13b provided with a lengthwise linear array of closely spaced notches in and along the surface thereof which function as catches 13c and provide selectively adjustable positioning locations for the work holders 15 at numerous alternative locations along the length of the frontal side of each of the legs. The work holders 15 are individually slidably retained on the frontal side 13b of each leg 13 and guided along a path overriding the catches 13c by means of a pair of continuous marginal shoulders, or rails 13d, disposed lengthwise of each of the legs and along opposite sides thereof; the arrangement being such that one rail is located along and projects laterally outward from each opposite marginal edge of each of the frontal sides 13b of each of the legs 13, and being such that each pair of rails 13d forms the laterally enlarged portion of the T-shaped cross-sectional structural configuration of each of the legs.

Provision for adjustable attachment of one each of the struts 14 to one each of the legs 13 is afforded by an elongated medial opening, or guide slot 13e, which preferably extends throughout the major portion of the length of each leg. Each guide slot 13e receives and carries fastening means 17 which interconnect the legs 13 with the upper end 14a of one each of the struts 14. As is best illustrated in FIG. 5, the fastening means 17 may be of conventional construction and comprise a manually adjustable wing nut 17a threaded onto the stem of a bolt 17b loosely journaled through a transverse aperture in the upper end of each of the struts 14 and through the guide slot 13e. Adjustment and relocation of each of the struts 14 lengthwise of the legs 13 may be readily accomplished by temporarily loosening the wing nut 17a sufficiently to permit the fastening means 17 and interconnected strut 14 to be shifted to another location within and along the length of the guide slot 13e. Such adjustment and relocation will be found to be desirable to accomplish a more effective support of the legs 13 as the latter are rearranged in various inclined positions, such as, among others, the two alternative inclined positions represented by solid and broken lines, respectively, in FIG. 2.

The telescopically adjustable cross members 16 interconnecting and retaining the platform sections 12 in side-by-side relationship are constructed so as to be extensible and retractable to accommodate adjustment of the lateral spacing of the platform sections relative to each other. Structurally, each of the cross members 16 comprises a pair of elongated centrally slotted arms 16a and 16b which are arranged in superimposed or overriding relationship with respect to each other and with the slotted portions in registered alignment. As best shown in FIG. 3, interlocking telescopic movements of each pair of the arms 16a and 16b is afforded by adjustable fastening means 18, which may be of the same conventional type as the fastening means 17, previously described, and comprising a bolt 18a having a threaded stem portion received through elongated guide slots 16c and 16d (FIG. 1) provided in the arms 16a and 16b, respectively, and arranged in aligned registry with each other. A manually adjustable wing nut 18b threadably carried on the stem portion of the bolt 18a permits the fastening means to be temporarily loosened to permit selective extensible and retractable telescopic movements of the cross members 16 when it is desired to alter the spacing of the platform sections 12 to better support and accommodate work pieces of different sizes.

As mentioned, the work holders 15 are designed to ride on the frontal side 13b of the legs 13 and selectively interlock with the catches 13c which are provided at various closely spaced locations along the major portion of the length of the legs. Thus, the work holders 15 may be stationed at various holding locations along the length of the legs. For example, the work holders 15 may be employed to gravitationally support the work pieces 11 at the desired elevation, as in FIGS. 1 and 2. Alternatively, of course, the work holders 15 may be reversed end-for-end on the legs 13, as in FIG. 6, and function to restrain the upper edge or edges of the work pieces. In accordance with the latter alternative aspect, it will be observed that the pivot end 13a of each of the legs 13 is provided with a U-shaped flange 13f which projects outwardly from the frontal side 13b and hooks backwardly thereover to form a groove in which to gravitationally support and cradle the lower edge of a work piece 11. Thus, when it is desired to support a work piece near the base of the stand, the U-shaped flanges may be utilized in cooperative conjunction with the work holders 15 to retain both the upper and lower edges of the work piece by merely arranging the work holders 15 in such manner, as shown in FIG. 6, which are turned end-for-end from the work holder positions shown in FIGS. 1 and 2.

As best observed in FIGS. 4 and 5, each of the work holders 15 includes a body portion 15a which is flanked on opposite sides by a pair of integral laterally disposed guide retainers 15b. Each of the guide retainers 15b have depending uncinate outer end portions 15c, respectively, terminally converging toward each other and cooperating with the underside 15d of the body portion to define a T-shaped guideway, or keyway, as at 15e, in which to slidably and axially receive the frontal side 13b and guide rails 13d of the legs 13. When the work holders 15 are received on the legs, as illustrated, the guide retainers 15b straddle the legs 13 and the uncinate outer end portions 15c thereof project beneath the underside of the guide rails 13d and retain the work holders thereon for guided slidable travel along a path running lengthwise of the legs and overriding the linear array of catches 13c.

On the underside 15d of each of the work holders 15, there is a downwardly and forwardly inclined tang 15e. Also, arranged on the underside 15d of each of the work holders 15 is resilient biasing means 15f which cooperates with the guide retainers 15b to provide means of imparting a pivotal rocker action to each of the work holders 15. The relative disposition of the tang 15e, the resilient biasing means 15f and the guide retainers 15b which gives rise to the pivotal rocker action of the work holders 15 is such that the tang 15e and resilient biasing means 15f are spaced apart lengthwise of the underside 15d of each work holder and straddle the guide retainers 15b, and is also such that the resilient biasing means 15f is arranged in a location intermediate the guide retainers 15b and the notched end portion 15g of each of the work holders.

According to the preferable form illustrated, the tang 15e is formed integrally with each of the work holders 15 and the resilient biasing means 15f is constituted as an arched strap or band of resilient, flexible, spring steel or plastic material. The arched structure of the resilient biasing means is such that it arches downwardly from the underside 15d of each of the work holders and resiliently biases against the frontal side 13d of the legs 13 so as to urge that end of the work holder outwardly from the frontal side and concurrently rock or pivot the tang 15e located at or near the opposite end of the work holder towards and into engagement with one of the catches 13c. Disengagement or withdrawal of the tang 15e from the catches 13c may, of course, be accomplished by depressing the notched end of the work holders 15 sufficiently to pivot or rock the tang 15e out of engagement with the catches 13. When thus disengaged, each of the work holders 15 may be slidably shifted lengthwise along the legs 13 to register the tangs 15e with another selected catches 13c. When thus disengaged, each of the work holders 15 is, as illustrated, effected by inserting the marginal edge portion of the work piece within the notches provided by the notched end portions 15g of the work holders 15. The notched end portion 15g, on each work holder, of course, also functions, in the manner illustrated, to receive and hold the marginal edge portions of the work pieces 11 which are placed on the legs 13.

By virtue of the foregoing description, it will be readily apparent that, as a consequence of the extensive adjustability, the supporting stand of the present invention may be utilized in conjunction with work pieces such as placards, artist's canvases, and the like, having a wide range of sizes and differing dimensional characteristics. At the same time, the construction is such that the supporting stand is extremely stable. Furthermore, the construction is of inexpensive and practical design and particularly well-suited to being fabricated by conventional and inexpensive plastic molding techniques and procedures.

I claim:

1. In an adjustable supporting stand for a work piece such as an artist's canvas, display material and the like, the combination comprising a base, at least one work supporting leg pivotally interconnected with said base for pivotal movements between lowered and raised positions overlying said base, said work supporting leg having a frontal side provided with a lengthwise spaced array of catches, a work holder slidably carried on said leg for guided lengthwise slidable movements therealong in overriding relationship with said catches, said work holder having means for holding the marginal edge of said work piece and retaining the latter in gravitationally supported position on said frontal side of said leg, said work holder also having rocker means disposed intermediate the opposite longitudinal ends thereof permitting lengthwise rocking manipulation of said longitudinal ends towards and away from said frontal side of said leg and having a tang projecting from the underside thereof in a location near one of said longitudinal ends and adapted to rock into and out of engagement with said catches in response to manual rocking manipulation of said work holder, whereby said work holder may be slidably moved lengthwise of said leg and selectively engaged and disengaged with said catches when it is desired to vary the location of said work holder on said leg.

2. The combination defined in claim 1, including means for adjustably supporting said leg in a plurality of alternative raised positions.

3. The combination defined in claim 1, including a guideway defined in and running lengthwise of said leg, an elongated prop depending from said leg and having tightenable and loosenable fastening means on one longitudinal end thereof riding in said guideway and having an opposite longitudinal end adapted to bear against an upwardly facing side of said base, whereby said prop may be shifted between selective alternative fastened positions along said guideway propping said leg upwardly from said base in selected pivotally raised alternative positions.

4. In an adjustable supporting stand for a work piece such as an artist's canvas, display material and the like, the combination comprising a base, at least one work supporting leg pivotally interconnected with said base for pivotal movements between lowered and raised positions overlying said base, said work supporting leg having a frontal side provided with a lengthwise spaced array of catches, a work holder defining an underlying passageway disposed lengthwise thereof and slidably receiving said leg for guided lengthwise slidable movements of said work holder therealong in overriding relationship with said catches, said work holder having means for holding the marginal edge of said work piece and retaining the latter in gravitationally supported position on said frontal side of said leg, said work holder also having rocker means disposed intermediate the opposite longitudinal ends thereof for lengthwise rocking manipulation of said longitudinal ends towards and away from frontal side of said leg and having a tang projecting from the underside thereof in a location near one of said longitudinal ends and adapted to rock into and out of engagement with said catches in response to manual rocking manipulation of said work holder, whereby said work holder may be slidably moved lengthwise of said leg and selectively engaged and disengaged with said catches when it is desired to vary the location of said work holder on said leg.

5. In an adjustable supporting stand for a work piece such as an artist's canvas, display material and the like, the combination comprising a base, at least one work supporting leg having a T-shaped cross-sectional configuration and pivotally interconnected with said base to pivot between lowered and raised positions overlying said base, said work supporting leg having a frontal side provided with a lengthwise spaced array of catches, a work holder defining a T-shaped underlying passageway slidably receiving said leg for guided lengthwise slidable movements therealong in overriding relationship with said catches, said work holder having means for holding the marginal edge of said work piece and having rocker means disposed intermediate the opposite longitudinal ends thereof for lengthwise rocking movements of said longitudinal ends towards and away from said frontal side of said leg and having a tang projecting from the underside of one of said longitudinal ends and adapted to rock into and out of engagement with said catches in response to manual rocking manipulation of said work holder, whereby said work holder may be slidably moved lengthwise of said leg and selectively engaged and disengaged with said catches when it is desired to vary the location of said work holder on said leg, and a guideway defined in and running lengthwise of said leg, an elongated prop depending from said leg and having tightenable and loosenable fastening means on one longitudinal end thereof riding in said guideway and having an opposite longitudinal end adapted to bear against an upwardly facing side of said base, whereby said prop may be shifted between selective alternative fastened positions along said guideway propping said leg upwardly from said base in selected pivotally raised alternative positions.

6. In an adjustable supporting stand for a work piece such as an artist's canvas, display material and the like, the combination comprising a sectional base comprising a pair of base sections arranged in side-by-side relationship, at least one work supporting leg pivotally interconnected with each of said base sections to pivot in side-by-side relationship between lowered and raised positions overlying said base and having a frontal side provided with a lengthwise spaced array of catches, a work holder slidably carried on each leg for guided lengthwise slidable movements therealong in overriding relationship with said catches, each work holder having means for holding the marginal edge of said work piece and retaining the latter in gravitationally supported position on said frontal side of said leg, said work holder also having rocker means disposed intermediate the opposite longitudinal ends thereof for lengthwise rocking manipulation of said longitudinal ends towards and away from said frontal side of said leg and having a tang projecting from the underside thereof in a location near one of said longitudinal ends and adapted to rock into and out of engagement with said catches in response to manual rocking manipulation of said work holder, whereby each work holder may be slidably moved lengthwise of said leg and selectively engaged and disengaged with said catches when it is desired to vary the location of said work holder on its respective leg.

7. The combination defined in claim 6, including at least one telescopically extendible and retractable cross member interconnecting said base sections.

8. In an adjustable supporting stand for a work piece such as an artist's canvas, display material and the like, the combination comprising a sectional base comprising a pair of base sections arranged in side-by-side relationship, at least one work supporting leg pivotally interconnected with each of said base sections to pivot in side-by-side relationship between lowered and raised positions overlying said base and having a frontal side provided with a lengthwise spaced array of catches, a work holder slidably carried on each leg for guided lengthwise slidable movements therealong in overriding relationship with said catches, each work holder having means for holding the marginal edge of said work piece and retaining the latter in gravitationally supported position on said frontal side of said leg, said work holder also having rocker means disposed intermediate the opposite longitudinal ends thereof for lengthwise rocking manipulation of said longitudinal ends towards and away from said frontal side of said leg and having a tang projecting from the underside thereof in a location near one of said longitudinal ends and adapted to rock into and out of engagement with said catches in response to manual rocking manipulation of said work holder, resilient means near the other one of said longitudinal ends of each work holder biased against said frontal side of said leg and urging said tang to rock into engagement with said catches, said resilient means being adapted to yield sufficiently under the influence of manual depression thereof against said frontal side to rock said tang out of engagement with said catches, whereby each said work holder may be slidably moved lengthwise of its respective leg and selectively rocked into and out of engagement with said catches when it is desired to relocate the same along the length of its respective leg.

9. The combination defined in claim 8, wherein said resilient means is an arched resilient member arching downwardly from the underside of each said work holder and biased between the underside of said work holder and the frontal side of said leg.

10. The combination defined in claim 8, including additional means on the pivotal end of each said work supporting leg cooperating with each said work holder to hold said work piece upon said work supporting legs, said additional means being adapted to hold one marginal edge of said work piece while said work holder holds an opposite marginal edge of said work piece.

11. The combination defined in claim 10, wherein each said additional means is a hook-shaped member and defines a groove in which to gravitationally seat one marginal edge of said work piece.

12. The combination defined in claim 5, wherein said rocker means comprises a pair of guide retainers on opposite sides of and flanking said work holder, said guide retainers having uncinate outer end portions terminally converging towards each other and cooperating with the underside of said work holder to define said T-shaped passageway.

13. In an adjustable supporting stand for a work piece such as an artist's canvas, display material and the like, the combination comprising a sectional base comprising a pair of base sections arranged in side-by-side relationship, at least one work supporting leg pivotally interconnected with each of said base sections to pivot in side-by-side relationship between lowered and raised positions overlying said base and having a frontal side provided with a lengthwise spaced array of catches, a work holder slidably carried on each leg by means of slidably receiving the latter within a T-shaped underlying passageway defined in said work holder for guided lengthwise slidable movements therealong in overriding relationship with said catches, each work holder having means for holding the marginal edge of said work piece and retaining the latter in gravitationally supported position on said frontal side of said leg, said work holder also having rocker means disposed intermediate the opposite longitudinal ends thereof for lengthwise rocking manipulation of said longitudinal ends towards and away from said frontal side of said leg and having a tang projecting from the underside thereof in a location near one of said longitudinal ends and adapted to rock into and out of engagement with said catches in response to manual rocking manipulation of said work holder, said rocker means each comprising a pair of guide retainers on opposite sides of and flanking said work holder, said guide retainers having uncinate outer end portions terminally converging towards each other and cooperating with the underside of said work holder to define said T-shaped passageway, an arched resilient member near the other one of said longitudinal ends of each work holder and arching downwardly from the underside of each work holder and biased against said frontal side of said leg and urging said tang to rock into engagement with said catches, said resilient member being adapted to yield sufficiently under the influence of manual depression thereof against said frontal side to rock said tang out of engagement with said catches, whereby each said work holder may be slidably moved lengthwise of its respective leg and selectively rocked into and out of engagement with said catches when it is desired to relocate the same along the length of its respective leg.

References Cited by the Examiner

UNITED STATES PATENTS

| | | | |
|---|---|---|---|
| 2,969,607 | 1/1961 | Grumbacher | 248—456 |
| 3,027,679 | 4/1962 | Norvell | 248—449 |

FOREIGN PATENTS

| | | |
|---|---|---|
| 205,794 | 7/1924 | Great Britain. |
| 40,218 | 2/1937 | Netherlands. |

CLAUDE A. LE ROY, *Primary Examiner.*

J. F. FOSS, *Assistant Examiner.*

UNITED STATES PATENT OFFICE
CERTIFICATE OF CORRECTION

Patent No. 3,278,150                      October 11, 1966

Lawrence A. Pedee

It is hereby certified that error appears in the above numbered patent requiring correction and that the said Letters Patent should read as corrected below.

Column 4, line 60, for "13d" read -- 13b --; line 69, for "13" read -- 13c --; line 72, strike out "catches 13c. When thus disengaged, each of" and insert instead -- catch 13c. Seating of the work pieces 11 on --.

Signed and sealed this 5th day of September 1967.

(SEAL)
Attest:

ERNEST W. SWIDER                      EDWARD J. BRENNER
Attesting Officer                        Commissioner of Patents